(12) United States Patent
Wayne et al.

(10) Patent No.: US 6,570,721 B2
(45) Date of Patent: May 27, 2003

(54) OPTOMECHANICAL MOUNT FOR PRECISELY STEERING/POSITIONING A LIGHT BEAM

(75) Inventors: Kenneth J. Wayne, Saratoga, CA (US); Jan W. Broenink, Weesp (NL); Englebertus A. F. van de Pasch, Oirschot (NL); Marcel H. M. Beems, Veldhoven (NL)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/930,752

(22) Filed: Aug. 15, 2001

(65) Prior Publication Data

US 2003/0011901 A1 Jan. 16, 2003

Related U.S. Application Data

(63) Continuation-in-part of application No. 09/906,869, filed on Jul. 16, 2001.

(51) Int. Cl.$^7$ ............................. G02B 7/02; F16M 9/00
(52) U.S. Cl. ................... 359/819; 359/822; 248/664
(58) Field of Search .................... 359/819, 822, 359/830; 248/664, 288.31, 288.51

(56) References Cited

U.S. PATENT DOCUMENTS

| 5,318,496 A | * | 8/1992 | Pong | ........................... 359/822 |
| 6,170,795 B1 | | 1/2001 | Wayne | ........................ 248/664 |

* cited by examiner

*Primary Examiner*—Georgia Epps
*Assistant Examiner*—Tim Thompson
(74) *Attorney, Agent, or Firm*—Jack H. Wu; Judy L. Shie

(57) ABSTRACT

An optomechanical mounting includes an upper spring assembly and a lower spring assembly that support and secure a sphere containing an optical element. The materials in the mounting have the same or nearly the same CTEs and spring assemblies provide opposing radial forces so that thermal expansions are compensated, giving the mounting superior thermal stability. Frictional forces on the sphere from the upper and lower spring assemblies maintain the orientation of the sphere (and the optical element) during operation, but smooth surfaces of the sphere and springs still permit sensitive, precision rotation of sphere for alignment without post-alignment clamping of the sphere. The spring assemblies can be ring-shaped to permit an opening through the spring assembly to the sphere for light paths or for tools that adjust the alignment of the sphere.

3 Claims, 8 Drawing Sheets

OPTOMECHANICAL MOUNT FOR PRECISELY STEERING/POSITIONING A LIGHT BEAM

CROSS REFERENCE TO RELATED APPLICATION

This application is a continuation-in-part of U.S. patent application Ser. No. 09/906,869 of Kenneth J. Wayne et al., filed Jul. 16, 2001, entitled "Optomechanical Mount for Precisely Steering/Positioning a Light Beam."

BACKGROUND

Many optical systems require precision optomechanical mountings that hold optical elements in the positions and orientations required for operation of the system. To achieve proper positioning and alignment of an optical element, an optomechanical mounting generally must allow movement or rotation of the optical element relative to other optical elements during an alignment process, but once the optical element is aligned the mounting must securely hold the optical element to maintain the proper alignment during shipping and use of the optical system. A conflict exists between the need to align an optical element with great precision and the need to have the optical element remain aligned for the lifetime of the optical system.

To provide adjustability for alignment and still securely hold the optical element in position, optomechanical mounts often use clamping systems. In particular, an optical element in the optomechanical mounting can be adjusted or aligned when the clamp is loose, but the optical element is rigidly held when the clamp is tightened. One concern in optomechanical mounts using clamps is disturbance of the optical element's alignment when clamping the optomechanical mount.

Using the same clamping friction during alignment and use of an optical system avoids disturbances that arise from post-alignment clamping but requires a tradeoff between alignment precision and operational stability. In particular, a multi-axis interferometer typically requires optomechanical mounts that can precisely orient laser beams with sub-microradian sensitivity. An optomechanical mount with a pure kinematic design can provide sub-microradian sensitivity, but typically cannot hold that alignment when subjected to shock, vibrations, and temperature changes. A ruggedly clamped, and therefore stable, optomechanical mount generally is difficult to adjust with sub-microradian precision. Accordingly, tradeoffs are generally required between the precision of adjustments and the stability, and a semikinematic design is often the compromise.

FIG. 1 shows an optomechanical mounting 100 that emphasizes minimal constraint and adjustment sensitivity. Such optomechanical mountings are further described in U.S. Pat. No. 6,170,795. Optomechanical mounting 100 includes a support 14, a three-sphere nest 20, a sphere 12, a top plate 14, and a spring preloaded plunger 26 (spring not shown) operated by a clamp screw 28. Sphere 12 contains an optical element such as a mirror (not shown) that can be rotated on three-sphere nest 20 for an alignment process that changes the orientation of the optical element without changing the position of its optical center.

Alignment of the optical element, which is fixed at the center of sphere 12, generally requires loosening clamp screw 28 to relieve or reduce the clamping force on sphere 12 and permit rotation of sphere 12. The spring (not shown) bearing on plunger 26 thus applies an initial stabilizing force directed along a radius of sphere 12. Once sphere 12 is aligned, tightening clamp screw 28 overcomes the spring and causes plunger 26 to apply the clamping force, which holds sphere 12 in the proper orientation. The final clamping force is set by applying a prescribed torque to clamp screw 28, and the frictional forces resulting from the clamping force resist rotation of sphere 12 to retain the alignment of the optical element.

The need to loosen clamp screw 28 before alignment and the need to tighten clamp screw 28 after alignment increase the total time required for the alignment process. Additionally, clamp screw 28 may not be easily accessible in an optical system, which makes the alignment process more difficult. Additionally, tightening clamp screw 28 causes bending of the assembly and hence disturbs the accuracy of the just-completed alignment. For most applications, an optomechanical mounting is desired that maintains precise angular orientation of the optical element without requiring additional procedures to apply a clamping force after the alignment process.

SUMMARY

In accordance with an aspect of the invention, an optomechanical mounting includes an upper spring assembly and a lower spring assembly that support and secure a sphere containing an optical element fixed at its center. The spring assemblies can be substantially identical so that thermal expansions affecting one assembly compensates for identical opposing thermal expansion affecting the other spring assembly, giving the optomechanical mounting superior thermal stability. Frictional forces on the sphere from the upper and lower spring assemblies maintain the orientation of the sphere (and the optical element in the sphere) during operation but still permit rotation of the sphere for alignment without removing either spring assembly or releasing the spring tension that the spring assemblies apply to the sphere.

Each spring assembly can include springs around a perimeter of a ring so that a central region of each assembly is open for an optical path through the assembly. Alternatively, the central region can be open to provide access for tools that facilitate rotation the sphere for alignment of the optical element.

Embodiments of the invention can exhibit excellent long-term alignment stability when subjected to temperature changes, shock, and vibration. The symmetry of the optomechanical mount and the use of similar construction materials in the elements of the mount provide excellent thermal stability. High clamping forces between the springs and the sphere resist alignment changes caused by mechanical shock. In particular, frictional forces at multiple points on the sphere resist rotation of the sphere after alignment is achieved, but fine surface finishes on the sphere and spring make smooth, high resolution rotational adjustment achievable with removable alignment tools. Vibration stability results because the springs, which stiffen due to geometrical deformation as a result of high compressive forces, wrap tightly around the sphere to provide a stiff, highly damped spring/mass system having a high resonant frequency, typically greater than 3 kHz.

One specific embodiment of the invention is a system that includes a sphere adapted for mounting an optical element, a first set of springs including multiple springs in contact with the sphere; and a second set of springs including multiple springs in contact with the sphere. Generally, each spring in the first set has a corresponding spring in the second set, and each spring in the first set applies a force to the sphere that is collinear with and opposite to a force that the corresponding spring in the second set applies to the sphere. All spring forces are directed through the center of the sphere. The opposing forces from the springs maintain positional stability of the sphere when the optomechanical mounting is subjected to thermal variations, vibrations, or shock.

Typically, either set of springs can be mounted on an inner surface of a support ring. The inner surface of the support ring is typically a conic section with fixtures for mounting the springs, and each spring can be a leaf spring set at an angle according to the normal to the sphere's surface where the spring contacts the sphere. The support rings can be open in the center for light paths of the optical element or for access to the sphere during the alignment process. A case on which the support rings are mounted can control the separation of the first and second set of springs or their associated support rings to control magnitudes of forces that the first and second sets of springs apply to the sphere.

Another embodiment of the invention is a system wherein spring washers are used to support and apply force on the sphere. Fewer springs are required, and no fixtures need to be created on the inner surface of the support ring.

BRIEF DESCRIPTION OF THE DRAWINGS

FIG. 9B is a cross-sectional view of the objects in FIG. 9A, taken along a vertical plane passing through the line B–B' shown in FIG. 9A. Support rings have been added to this view, and the sphere cross-section is represented by a circle to keep the picture clear and easily understood.

Use of the same reference symbols in different figures indicates similar or identical items.

DETAILED DESCRIPTION

In accordance with an aspect of the invention, upper and lower spring assemblies support a sphere containing an optical element. The spring assemblies are substantially identical and are oriented so that each spring applies a force along a radius of the sphere. Each of theses forces is collinear with an opposing force from a spring in the other spring assembly. The springs accordingly hold the sphere in position with a high degree of thermal stability because thermal expansion that changes a force from one spring assembly is matched by a thermal change in the opposing force from the other assembly.

Each spring assembly can include springs on a support ring with a central portion of the assembly opened for an optical path or alignment tool access.

Figure 1:
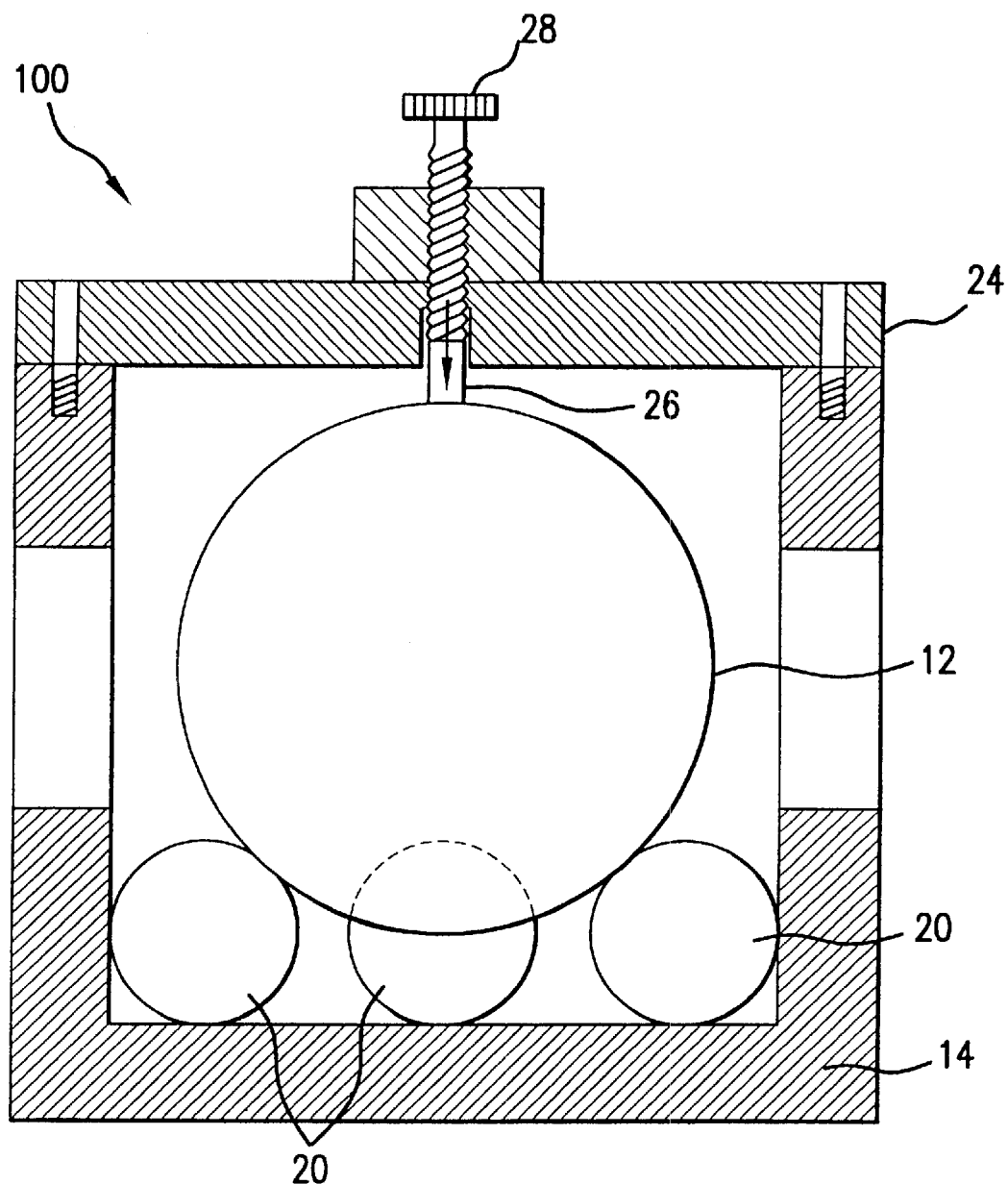
FIG. 1 is a cross-sectional view of a known optomechanical mounting.
Figure 2:
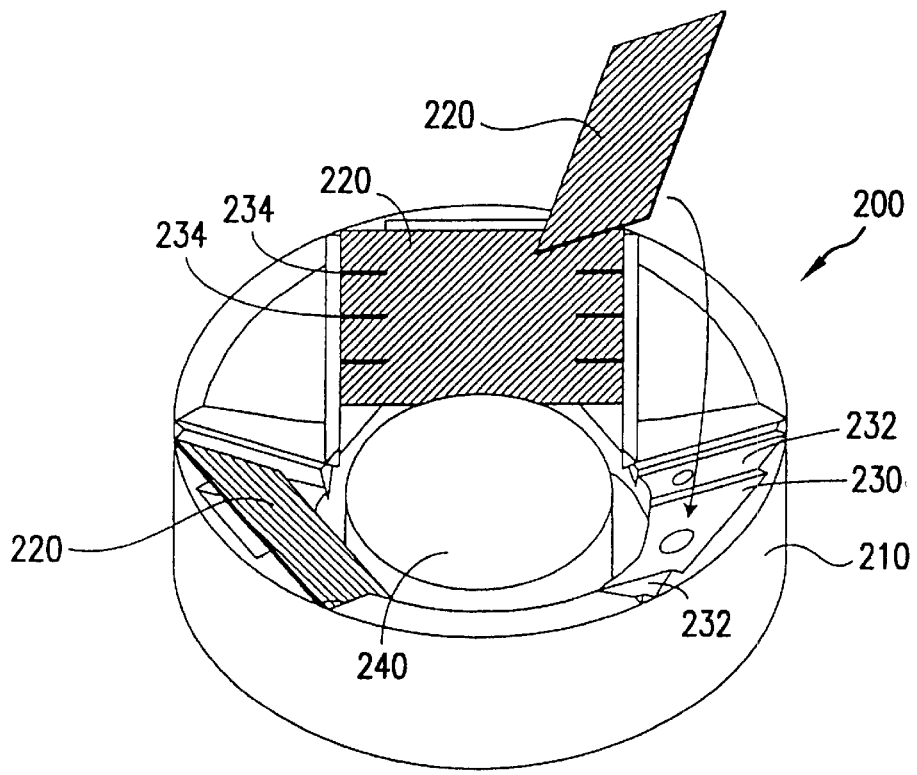
FIG. 2 is a perspective view of a lower spring assembly for an optomechanical mounting in accordance with an embodiment of the invention.

FIG. 2 is a perspective view of a lower spring assembly 200 in accordance with an exemplary embodiment of the invention. Spring assembly 200 includes three leaf springs 220 attached to a support ring 210.

Support ring 210 is made of a rigid material such as tool steel and is predominantly circular with a conical inner surface. In the exemplary embodiment, support ring is about 14 mm thick and has an outer diameter of about 44.22 mm. The inner surface has a cylindrical portion with a diameter of about 25.7 mm and height of about 6.82 mm at the bottom of support ring 210. A conical portion extends upward at a 45° from the cylindrical portion. Accordingly, the conical portion has an opening at the top support ring 210 of about 39.92 mm.

Located 120° at-intervals around the inner surface of support ring 210 are fixtures 230 for seating and attaching leaf springs 220. In the exemplary embodiment of the invention, each leaf spring 220 is a rectangular piece of flat metal such as spring steel about 20.70 mm wide and 12.7 mm high with a thickness of about 0.00762 mm. Leaf springs 220 are flat in the exemplary embodiment of the invention but can be convex or concave in alternative embodiments of the invention.

Each fixture 230 is machined into the conical portion of the inner surface of support ring 210 and sized to accommodate a leaf spring 220. In the exemplary embodiment, fixtures 230 provide flat ledges about 4.15 mm wide, and leaf springs 220 are welded to ledges 232 by stitch welds 234 that are no more than 4.0 mm long to avoid welds extending beyond ledges 232. A locating pin 240, which is not a part of spring assembly 200, can help position springs 220 for attachment (e.g., welding) to support ring 210, and in the exemplary embodiment, locating pin 240 has a diameter of about 20.08 mm. In other embodiments, other means such as epoxy or spring tension can hold leaf springs 220 to support ring 210, or leaf springs can be free floating in the fixtures 230 of support ring 210.

Figure 3:
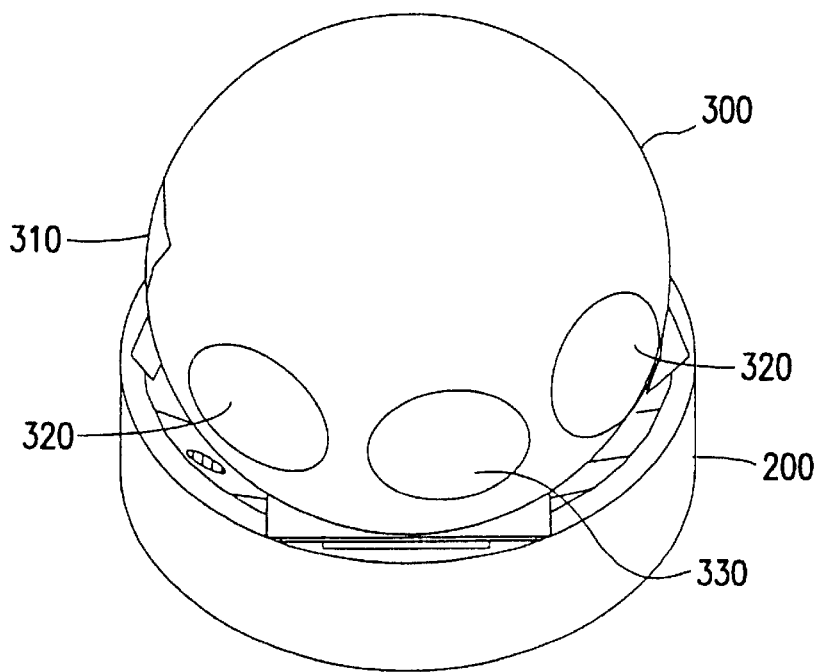
FIG. 3 is a perspective view of a sphere containing an optical element and positioned on the lower spring assembly of FIG. 2.

FIG. 3 shows a sphere 300 resting on lower spring assembly 200. Sphere 300 contains an optical element (not shown) such as a mirror, a beam splitter, a translating window, a wedge window, or a lens. In the exemplary embodiment, sphere 300 is a precision bearing about 41.275 mm in diameter that is machined to include an opening 310 for the optical element, openings 320 for light paths to and from the optical element. Sphere 300 can further include openings 330 that fit an alignment tool such as an Allen key or lever that can be used to rotate sphere 300 in the finished optomechanical mounting.

Figure 4:
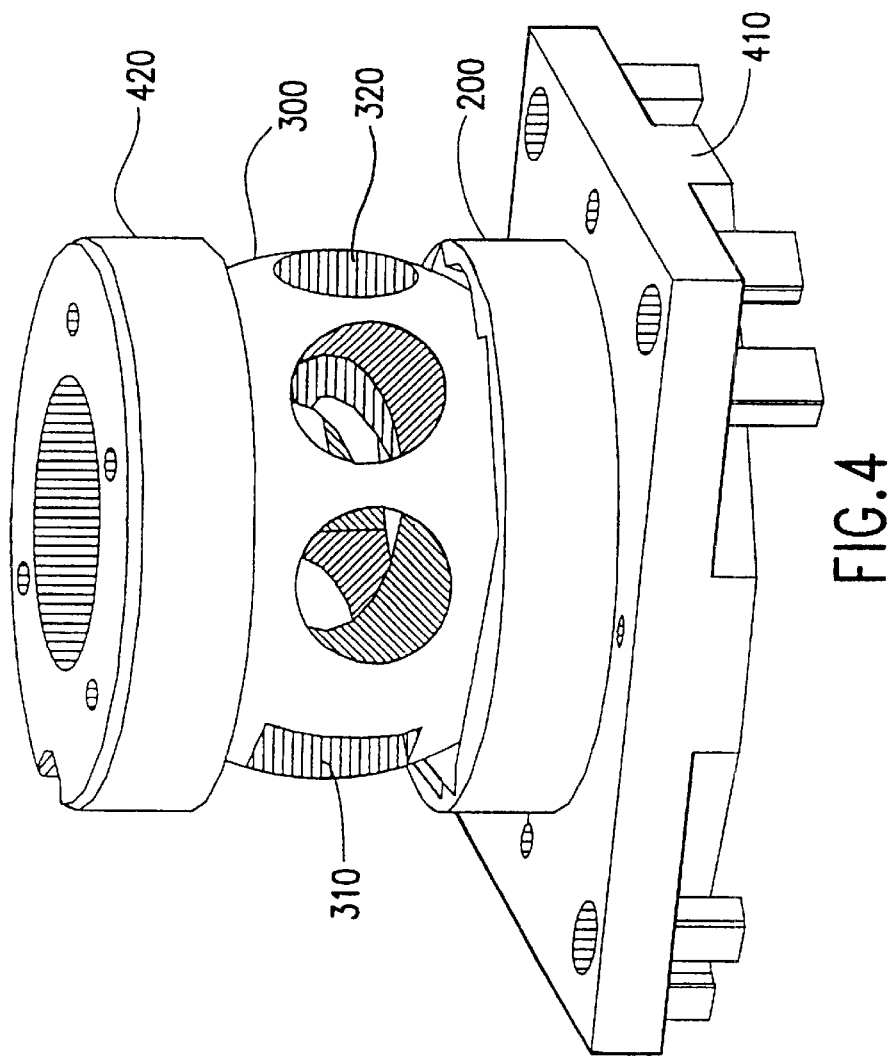
FIG. 4 is a perspective view of an upper spring assembly, a sphere containing an optical element, a lower spring assembly, and a base for an optomechanical mounting in accordance with an embodiment of the invention.

To assemble the optomechanical mounting, lower assembly 200 is attached (e.g., bolted) to a base plate 410 as illustrated in FIG. 4. Mounting feet of base plate 410 can be designed to flex rather than slip when the mount encounters differential thermal expansion, e.g., from a thermal gradient or when base plate 410 is attached to a base of a different material. Thus, when the temperature returns to normal the original alignment of the optical element is reestablished.

Sphere 300 is placed on lower spring assembly 200. An upper spring assembly 420, which sits on sphere 300 is attached inside a cover 510 shown in FIG. 5, and cover 510 is attached to base plate 410 so that upper spring assembly 420 contacts sphere 300 as shown in FIG. 4.

Figure 5:
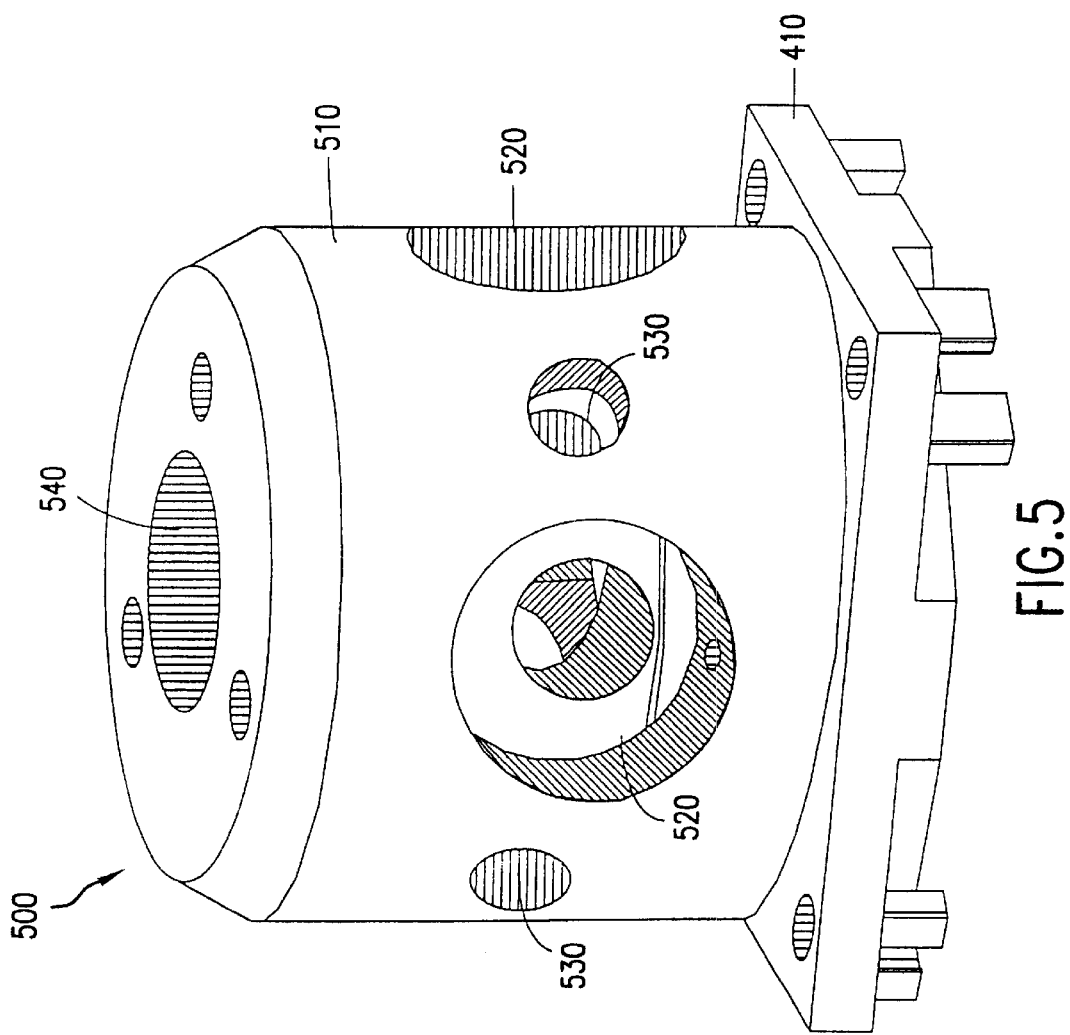
FIG. 5 is a perspective view of a complete optomechanical mounting in accordance with an embodiment of the invention.

The height of cover 510 of FIG. 5 and the gap between cover 510 and base plate 410 are selected so that cover 510 and base plate 410 apply pressure to upper and lower spring assemblies 420 and 200. In the exemplary embodiment of the invention, cover 510 has a cavity of height 42.83 mm that contains lower spring assembly 200, sphere 300, and upper spring assembly 420. As a result, in optomechanical mounting 500, the springs in upper spring assembly 420 and lower spring assembly 200 contact and apply radial forces to sphere 300.

All of the components in optomechanical mounting 500 can be made of the same material or materials that are substantially the same or at least have the same or similar coefficients of thermal expansion (CTEs). If the CTEs are the same, the entire assembly expands or contracts in unison when subjected to a temperature change. Thus, sphere 300 will not rotate during acclimatization, and the angular alignment of the optical element is preserved when the temperature changes.

Figure 6A:
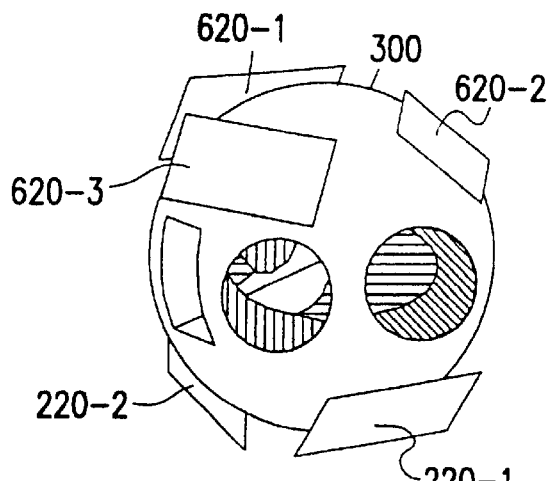
FIGS. 6A and 6B are perspective views showing the relative orientations of supporting springs in alternative embodiments of the invention.

In the exemplary embodiment, upper spring assembly 420 is substantially identical to lower spring assembly 200, but the attachments of lower spring assembly 200 to base plate 410 and upper spring assembly 420 to cover 500 orient springs 620-1, 620-2, and 620-3 (shown in FIG. 6A) of upper spring assembly 420 directly opposite corresponding springs 220-1, 220-2, and 220-3 (shown in FIG. 2) along respective lines through the center of sphere 300 as shown in FIG. 6A. For example, springs 220-1, 220-2, and 220-3 can be located at 0°, 240°, and 120° around a vertical axis of sphere 300, while springs 620-1, 620-2, and 620-3 are located at 180°, 60°, and 300° around the vertical axis. With this configuration, spring force vectors for a pair of springs (220-1, 620-1), (220-2, 620-2), or (220-3, 620-3) are collinear and pass through the center of sphere 300. Each spring 220 or 620 thus has a corresponding spring 620 or 220 that provides an equal, collinear opposing force through the center of sphere 300. Accordingly, springs 220 and 620 do not apply a torque to sphere 300, and changes in springs 620, for example, caused by changes in temperature, counter or cancel corresponding changes in springs 220 to keep sphere 300 from shifting position.

Figure 6B:
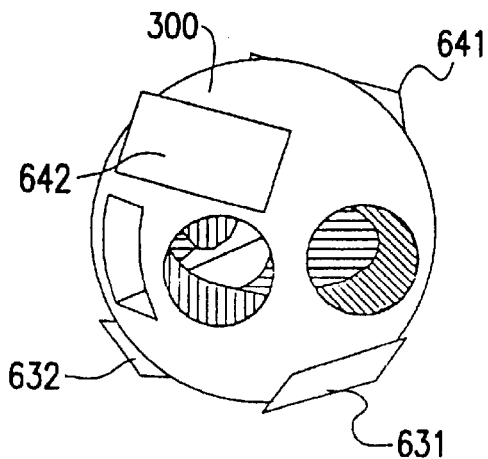

FIG. 6B illustrates the spring configuration in an alternative embodiment of the invention. The embodiment of FIG. 6B uses four springs 631, 632, 641, and 642 Two springs 631 and 632 are in a lower spring assembly (not shown), and two springs 641 and 642 in an upper spring assembly (not shown). Each spring 631, 632, 641, and 642 is a leaf spring having a surface perpendicular to the normal to the surface of sphere 300 at the respective contact points. The upper and lower spring assemblies are identical to each other, but the upper spring assembly is rotated by 90° relative to the lower spring assembly so that the contact points of sphere 300 with springs 631, 632, 641, and 642 are at the vertices of a symmetric tetrahedron. The resulting spring forces on sphere 300 are directed radially toward the center of sphere 300 and hold sphere 300 without applying a torque to sphere 300. Other spring configurations could similarly hold sphere 300 without applying a torque, for example, a single spring on top of sphere 300 could oppose and counter the resultant of the three forces from springs 220. However, such configurations lack the symmetry of the system of FIG. 6A, where each spring is paired with an opposing spring.

Accordingly, thermal expansion of a mount using a minimally constrained arrangement such as illustrated in FIG. 6B may change the position or orientation of sphere 300.

Returning to FIG. 5, cover 510 has openings 520 for light paths to and from the optical element in sphere 300 and openings 530 for tools used to rotate sphere 300 during an alignment process. Additionally, since spring assembly 420 is ring-shaped, an opening 540 in the top of cover 500 or bottom plate 410 can allow a light path through the top of cover 510 or allow access to the top of sphere 300 for a tool used to rotate sphere 300 during an alignment process. Similarly, access can be provided through base plate 410 to the bottom of sphere 300.

Figure 7:
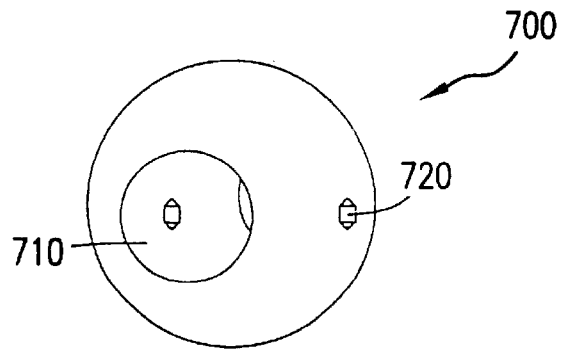
FIG. 7 shows a sphere for containing a refractive translator optic for a mounting in accordance with an embodiment of the invention.

Optical elements mounted in a sphere 300 can vary widely, but generally, the center of sphere 300 lies on an optical surface, an axis, and/or a symmetry plane of the optical element in sphere 300. FIG. 7, for example, illustrates a sphere 700 containing a refractive translator optic 710 for shifting the position of a laser beam perpendicular to direction of propagation of the laser beam. Translator 710 can simply be a thick piece of optical quality glass having parallel optical surfaces. An Allen key fit into an opening 720 can be used to rotate sphere 700 in an optomechanical mounting such as described above to change the incidence angle of an input beam and control the amount of shift refraction causes in translator 700. Additional access ports for tooling can be provided at almost any position, notably at 45° positions in a vertical plane.

Figure 8A:
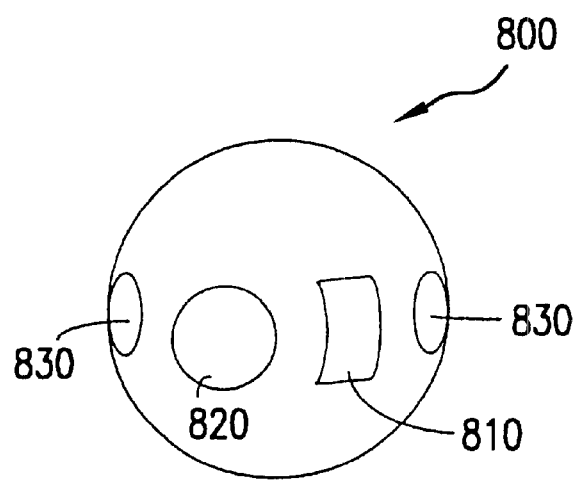
FIGS. 8A and 8B show a sphere for containing a reflective beam bender/splitter for a mounting in accordance with another embodiment of the invention.
Figure 8B:
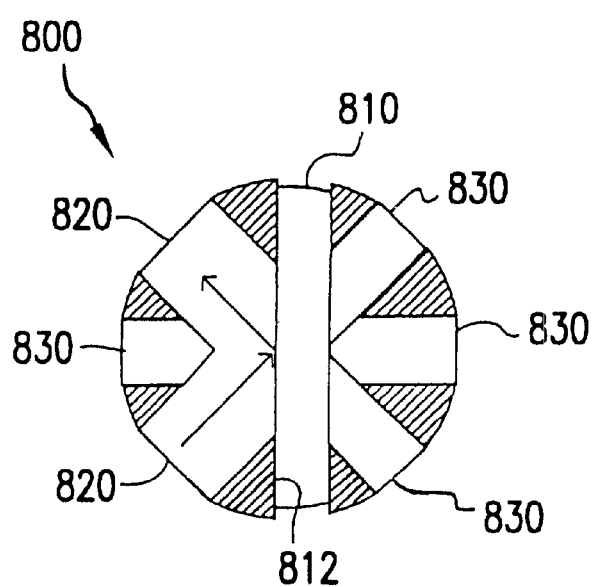

FIGS. 8A and 8B show perspective views of a sphere 800 used for a beam bender. Sphere 800 has an opening into which an optical element 810 having a highly reflective surface 812 is inserted and attached. Openings 820 are for an input beam and a reflected beam that enter and exit sphere 800. Openings 830, which are accessible through openings in the cover of the optomechanical mounting, allow a lever to rotate sphere 800 as required to align highly reflective surface 812 with the input beam. Optical element 810 is positioned so that highly reflective coating 812 is at the center of sphere 800 so that rotation of sphere 800 changes the angle of incidence of the input beam on surface 812 but does not change the point of incidence on surface 812.

Figure 9A:
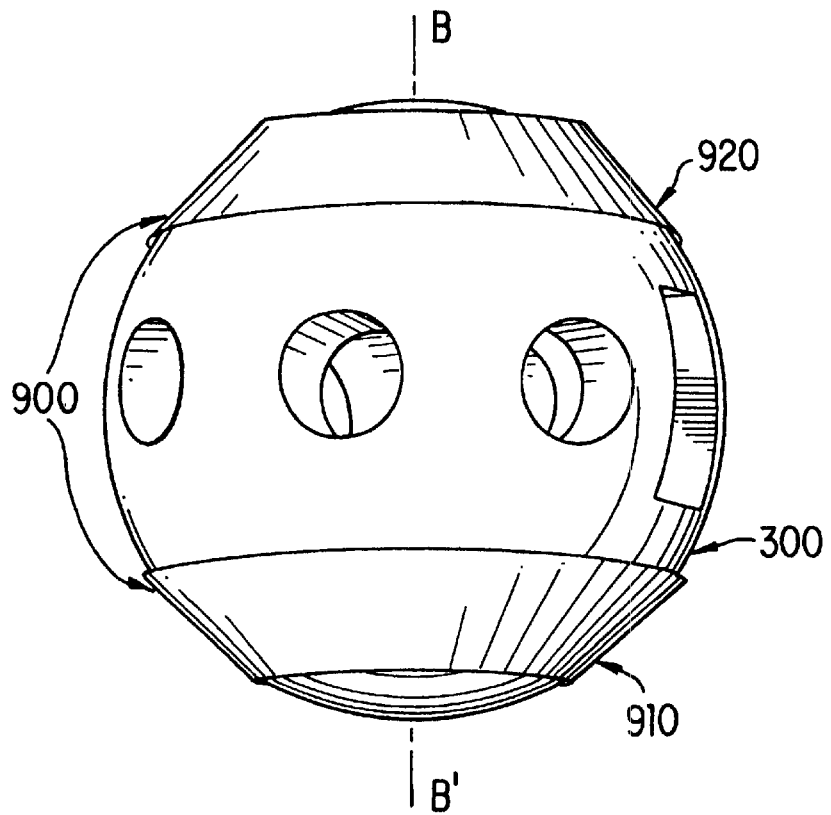
FIGS. 9A and 9B illustrate a sphere positioned between two spring washers in accordance with another embodiment of the invention.

FIG. 9A illustrates another embodiment of the invention using spring washers 900. The sphere 300 is positioned on a lower spring washer 910, such that the lower spring washer 910 contacts the sphere 300 along a longitudinal circle on the surface of the sphere 300. An upper spring washer 920 is placed opposite lower spring washer 910, such that the upper spring washer 920 also contacts the surface of the sphere 300 along a longitudinal circle.

The spring washers 900 are preferably made out of metal such as spring steel, stainless steel, or carbon steel. For some applications, the spring washers 900 should be polished to lower surface friction during alignment of the sphere 300. The spring washers 900 shown in the exemplary embodiment are Belleville spring washers, a type of washer well known in the art. Other washers, such as modified Belleville spring washers, can also be used. The spring washers 900 in the exemplary embodiment have an outer diameter of about 36 mm, an inner diameter of about 22.4 mm, and a thickness between 0.1 mm and 0.3 mm.

Figure 9B:
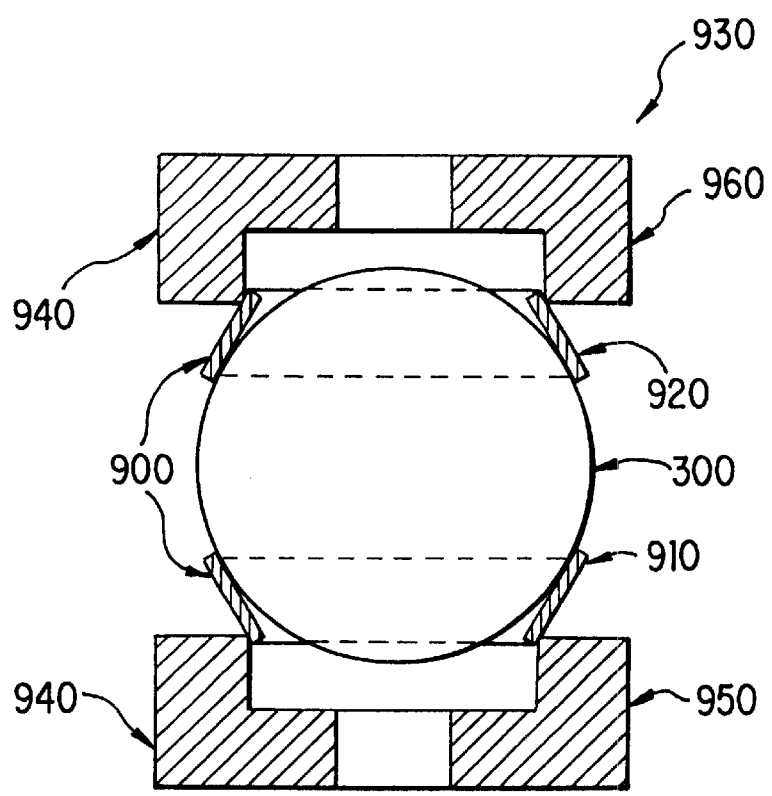

FIG. 9B is a cross-sectional view of the sphere 300, spring washers 900, and support rings 940 (collectively known as assembly 930) as assembled in accordance with this embodiment of the present invention. Lower support ring 950 and upper support ring 960 are similar to the support ring 210 shown in FIG. 2; each of the support rings 940 is predominantly circular, but the inner surface is cylindrical rather than conical, and does not have fixtures 230 for holding leaf springs 220 that are found in support ring 210. The spring washers 900 are positioned on the edge of the cylindrical inner surface of the support rings 940. In an alternate embodiment, the inner surface of the support rings 940 is slightly conical to help keep the spring washers 900 in place. The spring washers 900 are fastened in well-known ways (e.g., welded) to the support rings 940. Alternatively, the spring washers 900 can be left unfastened to the support rings 940.

To assemble the optomechanical mounting, the assembly 930 is attached to a base plate 410 (shown in FIG. 5). A cover 510 (shown in FIG. 5) is placed over assembly 930, such that cover 510 and base plate 410 apply force on support rings 940. The gap between cover 510 and base plate 410 can be varied to vary the magnitude of force applied. The support rings 940 apply force on the spring washers 900, such that the upper spring washer 920 exerts an equal, collinear opposing force on sphere 300 against the lower spring washer 910.

Although the invention has been described with reference to particular embodiments, the described embodiments are only examples of the invention's application and should not be taken as limitations. For example, although specific dimensions and materials were described for an exemplary embodiment of the invention, those dimensions and materials are subject to wide variations and replacements. Various other adaptations and combinations of features of the embodiments disclosed are within the scope of the invention as defined by the following claims.

We claim:

1. An optomechanical system comprising:
   a sphere adapted for mounting an optical element in the sphere;
   a first set of one or more springs in contact with the sphere; and
   a second set of one or more springs in contact with the sphere,
   wherein the first and second set of springs permit rotation of the sphere during alignment, but otherwise maintain the orientation of the sphere.

2. The system of claim 1, wherein each spring in the first set comprises a spring washer.

3. The system of claim 1, wherein each spring in the first and second sets comprises a spring washer.

* * * * *